(12) United States Patent
Trantham et al.

(10) Patent No.: US 9,218,849 B1
(45) Date of Patent: Dec. 22, 2015

(54) DATA LOSS MITIGATION IN A HEAT ASSISTED MAGNETIC RECORDING DATA STORAGE DEVICE

(71) Applicant: Seagate Technology LLC, Cupertino, CA (US)

(72) Inventors: Jon D. Trantham, Chanhassen, MN (US); Tim Rausch, Farmington, MN (US); John W. Dykes, Eden Prairie, MN (US); Edward C. Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/552,139

(22) Filed: Nov. 24, 2014

(51) Int. Cl.
*G11B 27/36* (2006.01)

(52) U.S. Cl.
CPC ...................... *G11B 27/36* (2013.01)

(58) Field of Classification Search
None
See application file for complete search history.

(56) References Cited

U.S. PATENT DOCUMENTS

| | | | |
|---|---|---|---|
| 5,537,533 | A | 7/1996 | Staheli et al. |
| 6,249,890 | B1 * | 6/2001 | Ukani et al. .................. 714/721 |
| 6,359,433 | B1 | 3/2002 | Gillis et al. |
| 6,460,151 | B1 | 10/2002 | Warwick et al. |
| 7,107,462 | B2 | 9/2006 | Fransdonk |
| 7,304,816 | B2 * | 12/2007 | Johnson et al. ................. 360/31 |
| 7,309,816 | B1 | 12/2007 | Bruce et al. |
| 7,333,284 | B2 | 2/2008 | Eto et al. |
| 7,369,339 | B2 * | 5/2008 | Kojima et al. .................. 360/31 |
| 7,543,178 | B2 | 6/2009 | McNeill et al. |
| 7,707,461 | B2 | 4/2010 | Dougherty et al. |
| 7,930,475 | B1 | 4/2011 | Kleiman et al. |
| 8,085,488 | B2 | 12/2011 | Feliss et al. |
| 8,760,780 | B1 | 6/2014 | Brooker |
| 8,854,929 | B1 * | 10/2014 | Champion et al. ......... 369/13.26 |
| 2012/0176435 | A1 | 7/2012 | Yamanobe |
| 2014/0177356 | A1 | 6/2014 | Su et al. |

* cited by examiner

*Primary Examiner* — K. Wong
(74) *Attorney, Agent, or Firm* — Hall Estill Attorneys at Law

(57) ABSTRACT

A data storage device may employ a heat assisted magnetic recording data writer separated from a plurality of data bits stored on a media surface of a data storage medium. At least one controller and a prediction circuit that is connected to the heat assisted magnetic recording data writer can be configured to remap the media surface in response to a predicted heat assisted magnetic recording data writer failure.

20 Claims, 4 Drawing Sheets

DATA LOSS MITIGATION IN A HEAT ASSISTED MAGNETIC RECORDING DATA STORAGE DEVICE

SUMMARY

In accordance with various embodiments, a heat assisted magnetic recording data writer may be separated from a plurality of data bits stored on a media surface of a data storage medium. At least one controller and a prediction circuit that is connected to the heat assisted magnetic recording data writer can be configured to remap the media surface in response to a predicted heat assisted magnetic recording data writer failure.

DETAILED DESCRIPTION

Advancements in semiconductor technology has allowed increasing numbers of computing devices, such as smartphones, tablet computers, and digital video recorders, to generate, store, and transfer large volumes of data. Heat assisted magnetic recording (HAMR) technology addresses growing amounts of data generation and corresponding storage needs while maintaining or increasing data storage device form factors and performance. However, it is possible that one or more HAMR components in a data storage device can fail over the life of the device, which renders the device incapable of store data to at least a portion of the device.

Accordingly, a data storage device may employ one or more HAMR data writers that are respectively connected to a controller and separated from a plurality of data bits stored on a surface of a data storage medium with the controller configured to transition each data bit of the plurality of data bits to a write protected mode in response to a predicted HAMR data writer failure. The ability to predict failures in the HAMR data writer allows proactive measures, such as the migration of cold data to the predicted failing data writer's surface or migration of hot data from the failing data writer's surface, to be taken to both reduce the quantity of write operations to the predicted failing data writer, which prolongs the writer's life, and to allow for the data storage device to maintain viable operation after the data writer fails. Transitioning the plurality of data bits in anticipation of a write-protected mode allows a recording head with a failed data writer to remain in use as a data reader, which maintains much of the functionality of the data storage device despite experienced failures.

Figure 1:
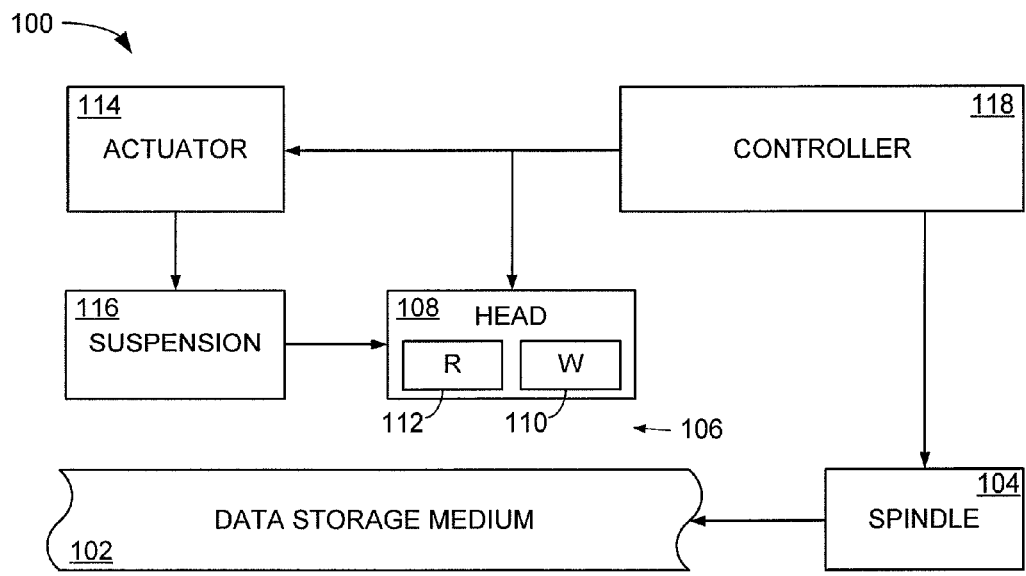
FIG. 1 is a block representation of an example data storage system configured and operated in accordance with some embodiments.

Although not required or limiting, a data storage device with a data writer employing HAMR technology may be utilized in the example data storage device 100 shown a block representation in FIG. 1. In the portion of the example data storage device 100 illustrated in FIG. 1, a single data storage medium 102 is connected to a rotatable spindle 104 that can operate to create an air bearing 106 on which a transducing head 108 flies to store and sense data bits stored in the data storage medium 102. The transducing head 108 can incorporate any number of computing components, such as a data writer 110 and reader 112, that are typically attached to an actuator 114 via a suspension 116 with a gimbal.

It is contemplated that the transducing head 108 and assembly may consist of other components, like microactuators, heaters, contact detection sensors, slider body, and electrical interconnects, that facilitate positioning of the data writer 110 and reader 112 elements over data bits and data tracks on the data storage medium 102 to read and store data bits individually and collectively. One or ore controllers 118 can be locally and remotely connected to the transducing head 108, actuator 114, and spindle 104 to provide data bit access operations to and from predetermined portions of the data storage medium 102.

Minimization of the physical size of the writer 110, reader 112, air bearing 106, and transducing head 108 has generally corresponded with increasing data bit areal density on the data storage medium 102. As such, the size of individual storage bits has been reduced, which stresses the magnetic thermal stability of each data bit, particularly data bit storage where magnetic polarity is imparted on the data bit from the data writer 110. Configuring the data writer 110 with HAMR technology allows for higher coercivity media which can alleviate the thermal stability issue and others.

Figure 2:
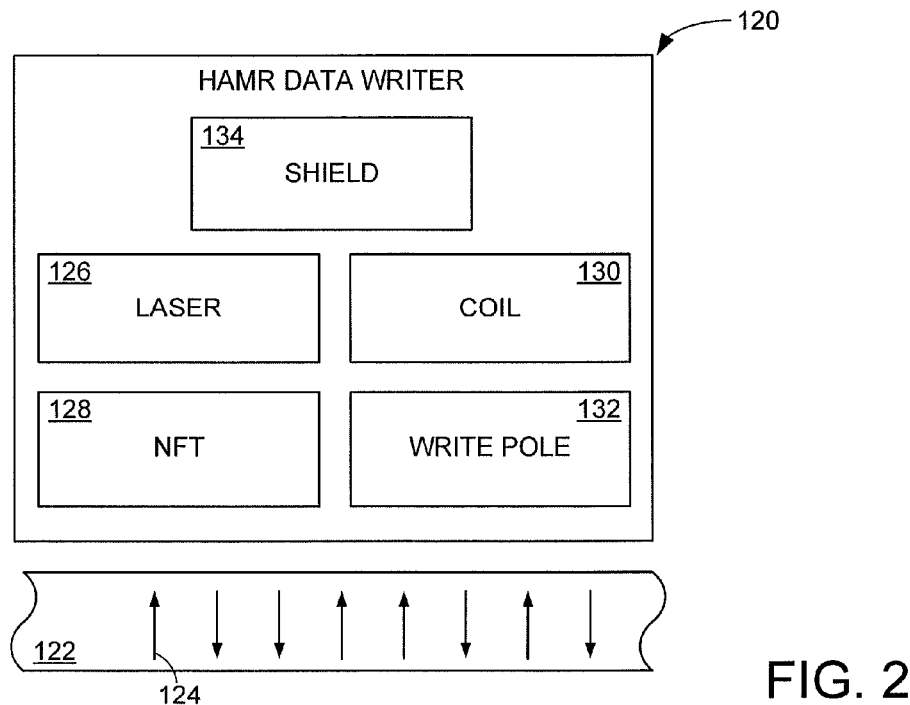
FIG. 2 displays a block representation of a portion of an example data storage device capable of being used with the data storage system of FIG. 1.

FIG. 2 is a block representation of an example HAMR data writer 120 that may be employed in the data storage device 100 of FIG. 1 in accordance with various embodiments. The HAMR data writer 120 can be incorporated partially or completely on a suspended portion of a transducing head to temporarily heat portions of the data storage medium 122 to lower the magnetic coercivity of selected data bit(s) 124 to allow magnetic flux of a predetermined polarity to magnetize selected data bit(s) 124.

The data storage medium 122 may be heated via any number of heat producing means, such as a laser diode 126 that passes a beam of light energy through a near field transducer 128 to bring the data bit(s) 124 past the data storage medium's Curie temperature and allow for magnetic flux from a coil 130 through at least one write pole 132 to magnetize the data bit 124. The write pole 132 may have one or more magnetic shields 134 that allow other data access components, such as a data reader, typically to be positioned proximal the data writer 120 on a transducing head.

It is contemplated that the heating means of the data writer 120, which may be characterized as the laser diode 126 and near field transducer 128, can fail at a greater frequency have a and shorter lifespan than the data reader. It is further contemplated that the heating means often experiences failures predictively and over time. That is, HAMR data writer failures can be predicted by identifying changes in the operating conditions of the HAMR data writer that indicate the media heating and/or the magnetic storage components of the data writer are trending towards failure.

It is contemplated that non-HAMR data writers, such as components without a laser diode 126 and/or near field transducer 128, can fail abruptly, which inhibits the ability to proactively adapt to a failing data writer. However, a HAMR data writer can experience degraded performance and changing writing characteristics over time that allows a controller to identify the data writer is failing and utilize the remaining life of the data writer to transition a data surface to fully read-only configuration or to at least greatly minimize the amount of additional writing on the predicted failing writer's corresponding data surface. That is, the laser diode 126 and near field transducer 128 can fail predictively and over time to allow infrequently updated cold data to be moved to the data surface corresponding to the failing data writer.

Figure 3:
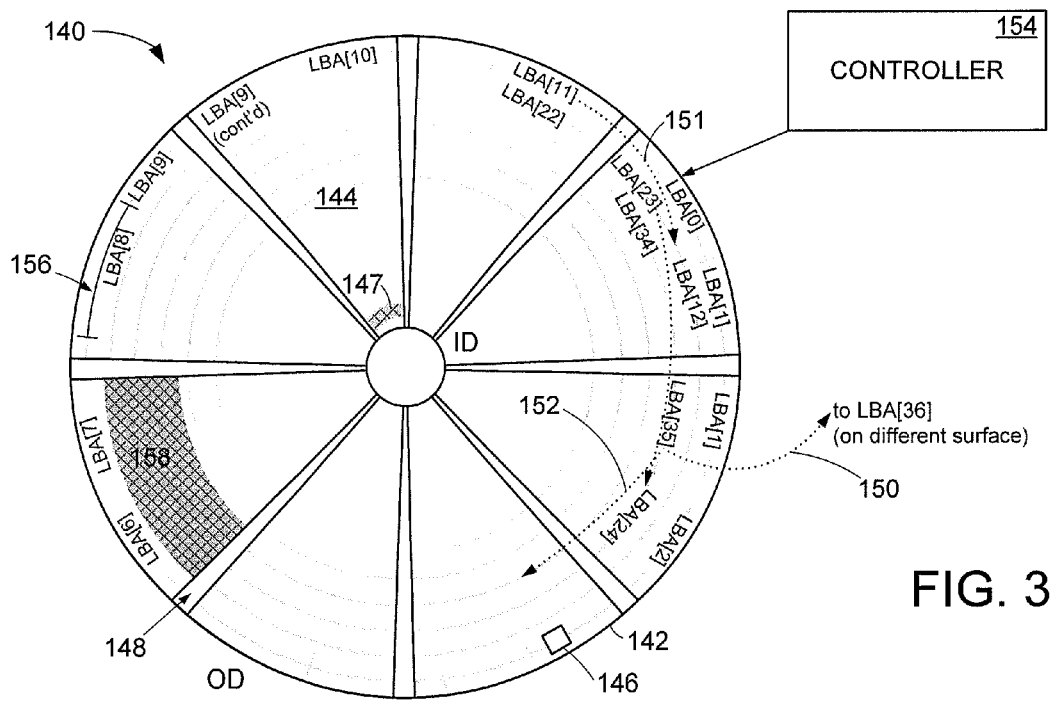
FIG. 3 shows a top view block representation of a portion of an example data storage device configured in accordance with some embodiments.

FIG. 3 illustrates a top view block representation of a media surface portion of an example data storage device 140 configured in accordance with various embodiments. One or more data storage media 142 can be arranged to store user data in user data wedges 144 with at least one transducing head 146 flying over the surface of the media. The data storage media 142 can have one or more non-user zones 147 where system data used for internal drive operation are stored and can have one or more servo wedges 148 where gray code and position error signals (PES) are stored during device manufacturing and protected from future alteration.

During manufacture or device formatting, for example, user data wedges can be split into concentric circular tracks which are further subdivided into physical sectors 156 on to which logical blocks (LBA[x]) are mapped. When writing data sequentially, a track is written and then the head moves to an adjacent track and begins writing at a later rotational offset 151. This pattern continues for at least a band of tracks, such as 50 tracks.

The logical blocks within a drive may be mapped on the data surface in a serpentine fashion where after a band of tracks has been written, the next LBA is found on a different recording surface on the same cylinder 150. Further LBAs then continue on this different surface, but the LBA-track ordering is in the opposite direction. A consequence of this pattern is that increasing LBAs may be in one track direction, such as from the outer diameter (OD) to the inner diameter (ID), for part of the data surface and in a different direction, such as from ID to OD, for other surfaces, such as portions of the first surface.

As a further consequence, the serpentine pattern can distribute LBAs throughout the data storage device in a manner that causes recording surface 142 to contain skips of large numbers of logical block addresses. Moreover, there may be many skips. In contrast, a surface with a contiguous LBA track mapping pattern 152, which can be characterized by all track switches being on the same data surface, such as by following path 152 instead of path 150, containing one band of logical blocks per surface allows for a single span of logical blocks on one data surface, which eases LBA management overhead.

In some embodiments, a controller 154 can re-map a portion 158 of the user data zones 144 to change from a serpentine pattern 150 to a contiguous pattern 152 in response to an encountered or predicted event, such as transducing head 146 data writer failure. Such mapping allows for reduced skips in the LBA mapping pattern, minimizing the complexity of remapping data. This method can optimize the management and movement of cold data by a host system that has limited visibility to the LBA mapping of the data storage device.

In another embodiment, the data storage device re-maps user data in response to a predicted writer failure without surface LBA mapping restrictions, such as those that might be imposed by trying to satisfy a contiguous or serpentine LBA pattern. As such, the device can be re-mapped when the device migrates data fully under internal control, which allows the device to migrate and re-map LBA assignments gradually over time, such as only when data is rewritten by the host. Another non-limiting embodiment has the controller 154 re-map both the logical blocks and the physical sectors in entirety. For example, the device may change the sector size, the number of logical blocks, and/or the storage capacity of data block segments on the data surface in response to a predicted writer failure.

An another instance, the controller 154 can identify a threshold event and re-map some of the LBAs of the serpentine pattern 150 so that a first segment increases to a greater number of constituent LBAs, which may be sequentially, continuously, or randomly mapped LBAs. Yet another non-limiting example configures the controller 154 to move LBAs to or from an outer code in response to an identified transducing head 146 event.

Figure 4:
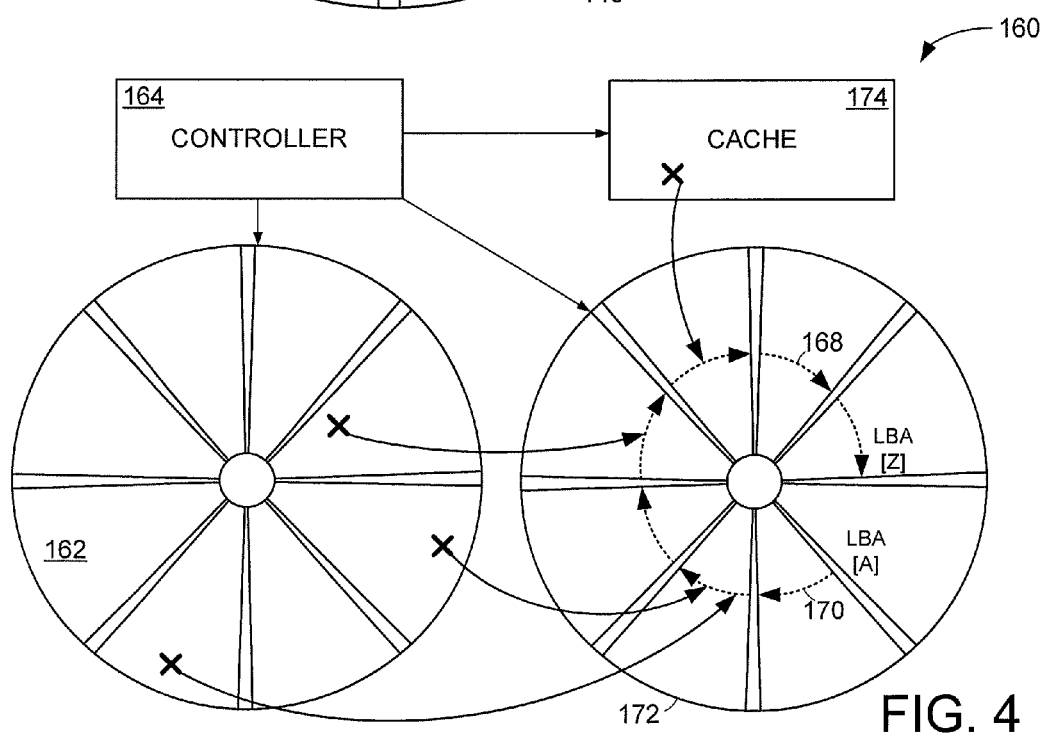
FIG. 4 illustrates a top view block representation of portions of an example data storage device configured in accordance with various embodiments.

FIG. 4 is a top view block representation of portions of data surfaces of an example data storage device 160 arranged in accordance with some embodiments. In data storage devices employing dynamic LBA to physical mapping technology, such as media caches, the mapping between LBA to physical address is virtualized. For example media 162 shows the location of three logical blocks if they were mapped in a conventional sequential-order device. In a device with a non-fixed mapping scheme, the controller 164 may cache these LBAs 166 and instead of writing them directly to the locations shown on media 162, it may instead write them sequentially to the media at locations 168 to 170.

Mapping scattered LBAs in this fashion, even temporarily, can allow for the drive to quickly service and respond to writes issued from the host system for LBAs, regardless of the previous location of the LBAs being overwritten by essentially writing the data immediately as received without seeking. The device 160 may often store these LBAs back into their more permanent storage locations, such as locations on media 172, at some later point, such as when the system is idle. Conversely, if the LBAs were written to first data surface 172 immediately, performance would be reduced when servicing random data operations form a host. Hence, a device 160 may contain a mixture of randomly mapped LBAs, for instance in a media cache, stored sequentially (temporarily) used in conjunction with a sequentially mapped serpentine LBA pattern in the main storage data surface.

It is contemplated that one or more data surfaces and data storage media can be manufactured so that at least some LBAs are contiguously mapped. As a non-limiting example, any number of volumes/partitions of LBAs can be continuously and contiguously arranged. In accordance with some embodiments, the data surface 172 corresponding with the predicted writer failure had been formatted with a serpentine LBA pattern prior to the predicted failure and is subsequently remapped to a partial or completely contiguous LBA pattern in response to a data writer failure being predicted. The ability to re-map portions of the data surface 172 can involve one or more cache memories 174, such as volatile and non-volatile rotating and solid-state memory, of existing data stored on the first surface 164 and the subsequent characterization of the corresponding physical locations as available for different LBAs.

In some embodiments, the data surface 172 corresponding with a predicted writer failure is partially or fully remapped to disjoint sequential regions in order to facilitate moving scattered cold data to the failing data surface 172 from any LBA range within the data storage device 160. The remapping of at least some of the predicted writer failure data surface 172 allows cold data to be relocated from a second media 162 to the remapped portions of the data surface 172. That is, the remapping of portions of the first data surface 164 to a contiguous LBA configuration can allow the failing data writer corresponding to the first data surface 164 to efficiently write large volumes of data with minimal seek times.

Various embodiments re-map portions of the data surface 172 to dis-contiguous LBAs to allow for the maximal amount of cold data to be stored on the data surface 172 corresponding to the failing data writer. The immediate full remapping of the data surface 172 is not required as a local or remote controller 164 can re-map the data surface 172 logically without moving or erasing data on the data surface 172. Such logical remapping can be conducive to small bands of LBA ranges that would not benefit from a large contiguous LBA configuration. It is contemplated that the controller 164 implements a data storage scheme as an object oriented system where the controller 164 conducts data migration from the other media 162 to the data surface 172 logically and without erasing or caching data already stored on the data surface 172. Such migration can optimize systems containing multiple redundant copies of the data storage on the data surface 172.

The logical and physical remapping of the data surface 172 can allow the controller 164 to evaluate the predicted amount of time available before a data writer fails and cater the migration of data to that available time. In other words, if a large amount of time is available before a data writer fails, the controller 164 may move data, remap large portions of the data surface 172 to contiguous LBAs, and conduct each write with immediate read verification. Conversely, a short amount of time available before data writer failure may trigger the controller 164 to re-map the data surface 172 only logically in the host system to allow the controller 164 to remap PBAs to LBAs at a more convenient time, such as only when the affected data is written by the host system.

With the controller 164 capable of intelligently choosing and executing data migration to/from another media 162 that has a good data writer to/from the data surface 172 with a failing data writer, predetermined types and amounts of data can be quickly migrated to the data surface 172. Although not limiting, data previously identified as cold data can be migrated from one or more data surfaces in a data storage system to the data surface 172 so that the failed data writer will minimally degrade data storage system performance. Conversely, data previously identified as hot data can be migrated away from the data surface 172 to other surfaces, such as surface 172, to minimize the amount of writing with the predicted failing data writer. That is, the controller 164 can continuously, sporadically, and routinely characterize data to allow quick aggregation of data to/from the data surface 172 in response to the prediction of the data writer failing, which results in less writing and the archiving of data that is read often and updated infrequently to be accessed even after the data writer fails.

Figure 5:
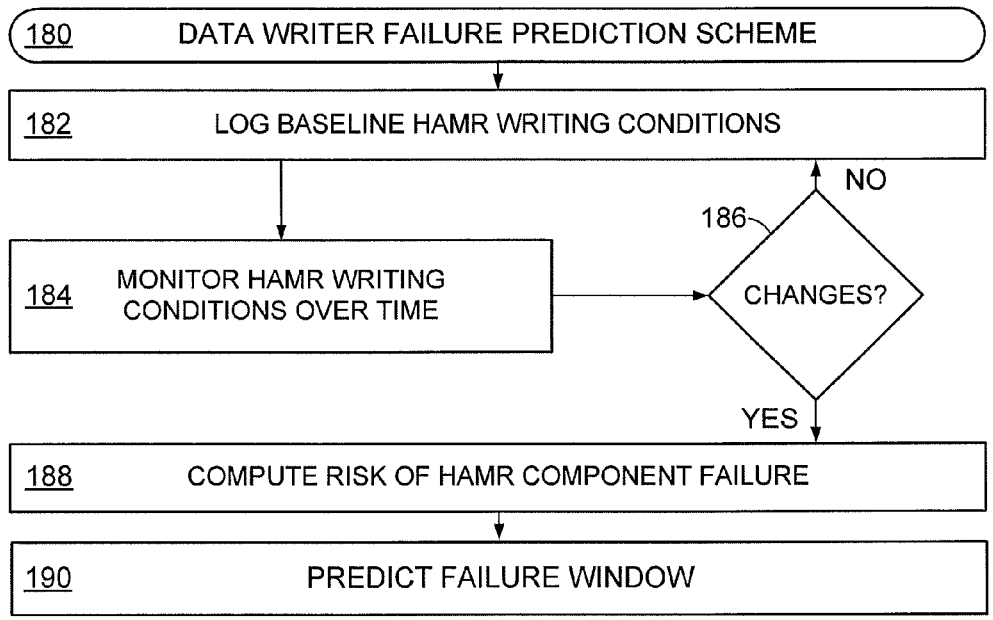
FIG. 5 is an example data writer failure prediction scheme carried out in accordance with some embodiments.

FIG. 5 shows an example data writer failure prediction scheme 180 that may be carried out in accordance with some embodiments with one or more HAMR data writers. The scheme 180 may initially log one or more baseline writing conditions in step 182 for at least one HAMR transducing head. The number, type, and duration of the logging in step 182 is not limited and can consist of a plurality of different conditions logged concurrently, continuously, or sporadically. For example, step 182 may establish baseline data writer values by detecting and logging at least detected laser power before, during, and after data writing operations, changes in applied laser current, changes in laser forward voltage drop, changes in the bit error rate (BER) of data written to a data storage medium, data track width changes on the data storage medium, and read-write-offset alignment changes.

Regardless of the number and type of writing conditions logged in step 182, step 184 can subsequently monitor at least one HAMR data writer for at least one of the writing conditions. Step 184 may occur in real-time or after data has been written to compile a set of current writing conditions that are compared to the baseline writing conditions in decision 186 to determine if changes have occurred. In some embodiments, decision 186 evaluates changes in writing conditions for severity and for predetermined indicators of a failing data writer. That is, some changing writing conditions, such as fly height, may change without indicating a failing data writer, which can be ignored by a controller in pursuit of changing writing conditions, such as increased BER, increased data track width, and altered read-write-offset, that correspond with heating means not performing properly.

In the event a writing condition has changed beyond a predetermined threshold value, decision 186 triggers step 188 to compute the risk of failure in the HAMR data writer. Step 188 may utilize predictive algorithms and tables to determine how conclusive the detected writing condition changes are in regards to data writer failure. As such, step 188 can determine that while writing conditions have changed, but not enough to warrant action by the controller as the risk of data writer failure is below a threshold, such as 10%. Step 188 may also evaluate a plurality of changing writing conditions together to determine the risk of data writer failure over a predetermined time frame, such as 1 minute, 1 hour, 1 day, etc.

Various embodiments can utilize step 184 to track the amount of time a laser assembly of a HAMR data writer has been powered on and the amount of time the laser assembly has been writing data. The straightforward tracking of power on and writing times can be characterized as a rough gauge as to the life of the laser assembly, which proceeds scheme 180 to step 188 where the powered times are evaluated for risk of failure. A computed data writer failure risk above a threshold value causes step 190 to predict the amount of time available before the data writer is useless. Step 190 can employ one or more algorithms, logged events, and data charts to provide an overall time and/or number of data writes available before the data writer no longer can write data reliably.

Being able to know how much time is available before a data writer fails can allow a controller to take measures to allow the data reading portion of the transducing head containing the failed data writing to remain as a viable contributor to data storage device performance. In other words, scheme 180 can provide a controller with the available time to move write once read only data to the data surface corresponding to the failed data writer and allow the data surface to remain a contributing portion of the data storage device. In an effort to efficiently utilize the available time before a data writer fails, portions of the data surface corresponding to the failed data writer can be partially or completely remapped.

Figure 6:
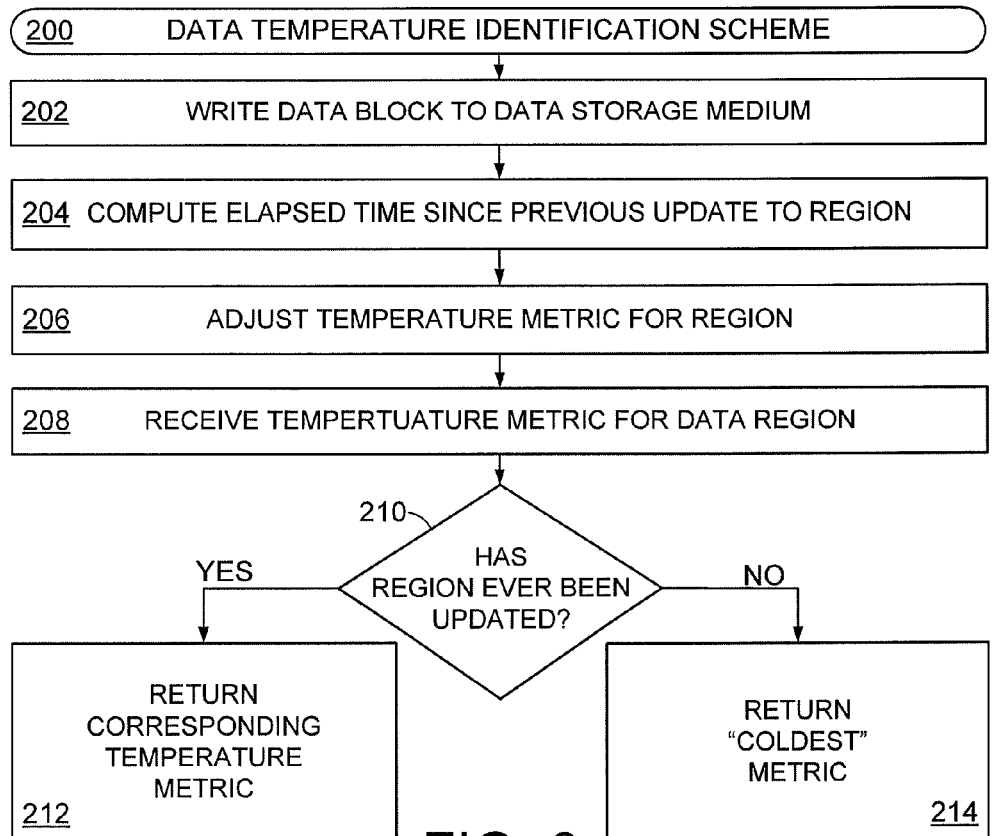
FIG. 6 displays an example data temperature identification scheme utilized in accordance with assorted embodiments.

FIG. 6 provides an example data temperature identification scheme 200 that may be carried out in accordance with some embodiments to characterize data in a local or network data storage system or in the data storage device itself. Two lists are used with this system: one list contains temperature metrics for regions of data comprising one or more LBAs and a second list contains the last modification time for each region. These lists are initialized prior to device usage, for example initialized during system manufacturing or formatting.

At least one algorithm activates routine 200 whenever a host writes one or more data blocks to at least one portion of a data storage system in step 202. The data blocks my be replicated in parity regions, such as in a redundant array of independent discs (RAID) configuration, or uniquely stored on local or remote solid-state or rotating data storage devices.

When a data block is written, a controller computes the amount of time between updates to the region containing the block of data in step 204. An update to a data block may consist of rewriting less than all of the data region, which may involve metadata not physically stored proximal a majority of data bits of the block.

Depending upon the amount of time elapsed since the previous modification, the temperature metric for the data region is increased or reduced in step 206. The amount of change is small to allow for gradual adjustment over the life of the product. Upon request to identify the temperature of the data in step 208, the system first checks if the region has ever been modified in step 210. If the region has been written at any point in time since the drive was manufactured, the temperature metric for the region is returned in step 212. If the region has never been written, a metric conveying the "very coldest" possible data is returned in step 214. By querying and sorting the temperature metrics for all data regions, the data storage device can order data regions from coldest to hottest, and use this information to identify and select data regions to migrate to/from predicted failure data surfaces, as appropriate.

In accordance with some embodiments, data blocks classified as cold data can be subsequently copied into a cache region, such as volatile memory, different portions of a rotating data medium, and solid-state non-volatile memory, to allow efficient burst writing onto a data surface in response to a predicted data writer failure corresponding to that data surface. Conversely, hot data may also be moved into a different memory or surface away from the predicted failing data surface. This migration can be done in steps to make available some or all of the physical locations where the recently migrated data was originally stored and to preserve the non-volatile integrity of the data.

Figure 7:
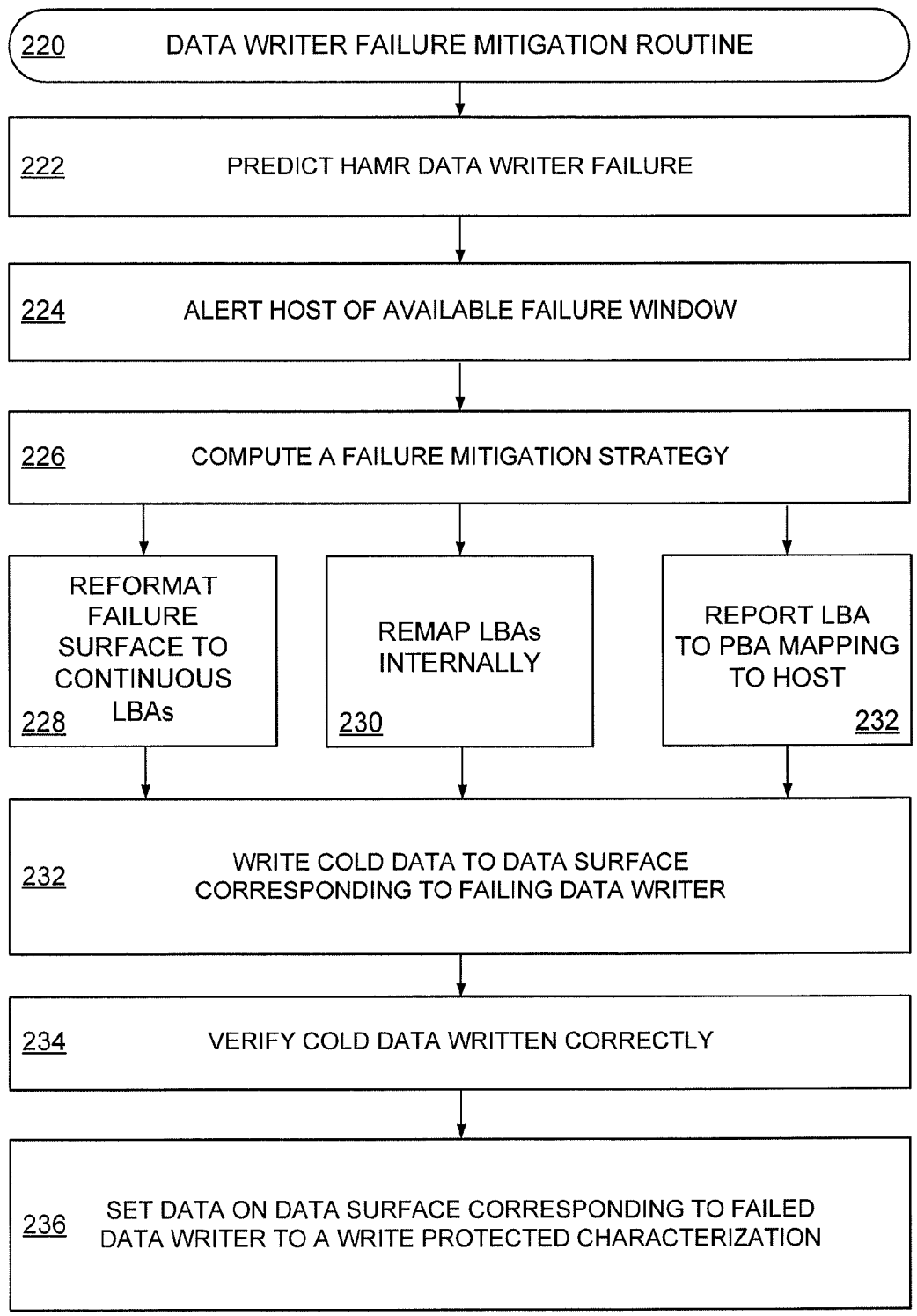
FIG. 7 plots an example data writer failure mitigation routine carried out in accordance with various embodiments.

Through schemes 180 and 200, one or more controllers can identify cold and hot data, predict data writer failure, and optimize the migration of the cold data to the data surface and hot data away from the data surface corresponding to the failing data writer. FIG. 7 illustrates an example data writer failure mitigation routine 220 that can be conducted independently and in conjunction with schemes 180 and 200 in accordance with various embodiments. Initially, step 222 predicts a failure of a HAMR data writer. Step 222 may predict the time available and risk of inaccurate data storage, but no such predictions are required.

Next, step 224 can optionally alert one or more local and remote hosts of a predicted failure and failure window corresponding with the number of data writes and/or amount of time available before a data writer fails. It is contemplated that a failing data writer may be one of many data writers incorporated into a data storage system and less than all the data writers may fail at the same time, or ever. The predicted failure window may be processed by at least one host or internally within the data storage device to compute a failure mitigation strategy in step 226 that determines a course of action that optimally migrates cold data to the data surface corresponding with the failing data writer, such as changing data writer laser writing power, hot data location, data bit writing density, and LBA mapping.

If relatively large amounts of time are available, a controller or separate host can proceed to remap portions of the data surface to contiguous LBAs in step 228. If the data movement is managed internally by the data storage device, the remapping can be performed locally in step 230. If a lesser amount of time, or number of data writes, are available, a controller can conduct logical-to-physical mapping of migrated data logically in step 232, which may occur at a later time, such as during system downtime, system standby, or scheduled maintenance times. Data identified as cold data can be subsequently written to the data surface corresponding to the failing data writer in step 234.

In a non-limiting embodiment, step 234 can write a destruction pattern of known or random values to a portion of the data surface to ensure no sensitive information if present on the data surface without the capability of subsequently being erased. Step 234 may also involve moving hot data from the data surface of the failing data writer to a secondary memory, such as a cache memory or other data surface. It is noted that hot data can be characterized as data identified as being updated more often than cold data, or perhaps by a predetermined threshold, such as 10 times more often than data identified as cold data.

With the data writer being identified as failing, various embodiments execute step 236 to verify the cold data written by the failing data writer soon after the cold data is written. The verification of written data in step 234 may be utilized to adjust status and time available before the data writer fails. For example, a large number of read verification fails in step 234 can indicate that the data writer has failed more quickly than predicted. Conversely, a small number of read verification errors in step 234 can indicate that more time, or data writes, are available compared to the predicted failure window. The ability to update a predicted data writer failure window can allow the controller to adapt to changing data writing environment conditions, such as temperature, electrical voltage, and mechanical, vibration, etc. to migrate cold data efficiently to the data surface corresponding to the failing data surface.

With cold data migrated to the failing data surface, or in the event the data writer fails before the cold data has been migrated, step 236 changes or reaffirms the characterization of each data bit on the data surface as writer protected. That is, the controller can set each data bit present on the data surface corresponding to the failed or failing data writer with an identifier that indicates no data writes are to be performed. The controller can return an error status if writes are attempted to the write-protected LBA region, for instance, on a SAS hard disk drive by returning a "09-2700" (Write Protected) error message response. The migration of cold data to the failing data surface can allow the functioning data reader portion of a transducing head to function and contribute to the data storage system despite the data writer portion of the transducing head failing.

It is noted that the various aspects of routine 220 are not required or limiting as any portion of any routine can be changed, added, and removed at will. For example, portions of schemes 180 and 200 can be wholly or partially inserted into routine 220. It can be appreciated that through the various steps of routine 220 a data storage system can remain viable despite failure in a data writer. The ability to quickly and intelligently migrate cold data to a data surface of a failing data writer can allow the data surface to remain functioning as a read only surface without degrading the performance of the data storage device due to the cold data having very few updates.

The emergence of HAMR technology can increase the data capacity of data storage devices, but may also experience design and process variations that result in failed data writers. The ability to intelligently identify cold data in a data storage system and predict a failing data writer allows a controller to take steps to mitigate a data writer failure by migrating cold data to the data surface corresponding to the failing data writer. By migrating cold data to the failed data surface, the data surface can remain an operational portion of a data storage system, which contrasts turning off both data writer and data reader portions of a transducing head in response to a failed data writer.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
predicting a failure in a data writer with a controller connected to the data writer, the data writer separated from a plurality of data bits stored on a media surface of a data storage medium;
remapping data stored to the media surface based on a predicted failure time window of a failure mitigation strategy generated by the controller in response to the predicted data writer failure; and
storing data identified as cold by the controller to the media surface.

2. The method of claim 1, wherein the controller remaps a portion of the media surface by removing all logical block addresses (LBAs) associated with the portion of the media surface, the portion of the media surface being less than an entirety of user assessable LBA on the media surface.

3. The method of claim 1, wherein the controller remaps a portion of the media surface by remapping at least one logical block address (LBA) to a secondary memory.

4. The method of claim 1, wherein the controller remaps a portion of the media surface corresponding with the predicted failure and a portion of at least one other data surface not corresponding with the predicted failure.

5. The method of claim 1, wherein the controller remaps a portion of the media surface to arrange a plurality of logical block addresses (LBAs) contiguously.

6. The method of claim 5, wherein the plurality of data bits are stored on the media surface in a serpentine LBA pattern prior to the remapping step.

7. The method of claim 1, wherein the controller remaps a portion of the media surface by setting each logical block address (LBA) resident in the portion of the media surface to a write protected mode.

8. The method of claim 1, wherein the controller predicts the failure in the data writer by recognizing changes in bit error rate for the plurality of data bits on the surface of the data storage medium.

9. The method of claim 1, wherein the controller predicts the failure in the data writer by recognizing an increase in width of at least one data track on the surface of the data storage medium.

10. The method of claim 1, wherein the controller predicts the failure in the data writer by recognizing changes in read-write-offset for the plurality of data bits on the surface of the data storage medium.

11. The method of claim 1, wherein the controller predicts the failure in the data writer by detecting a change in one or more laser attributes.

12. A method comprising:
separating a heat assisted magnetic recording (HAMR) data writer from a plurality of data bits stored on a first media surface of a first data storage medium;
predicting a failure in the HAMR data writer with a controller connected to the HAMR data writer;
remapping a portion of the first media surface based on a predicted failure time window of a failure mitigation strategy generated by the controller in response to the predicted HAMR data writer failure, the failure mitigation strategy configured to maximize space available on the first media surface for data;
identifying data stored on the second media surface as cold data with the controller; and
writing the identified cold data from a second media surface to the first media surface.

13. The method of claim 12, wherein the controller activates a write verify mode in response to the predicted failure in the HAMR data writer and prior to transitioning each data bit of the plurality of data bits to a write protected mode, the write verify mode consisting of verifying a previous data write operation to at least one data bit.

14. The method of claim 12, wherein the controller changes a laser power of the HAMR data writer prior to the writing step.

15. The method of claim 12, wherein the controller change a writing density of the HAMR data writer prior to the writing step.

16. The method of claim 12, wherein the controller remaps the portion of the first media surface by increasing a size of a serpentine segment of logical blocks.

17. The method of claim 12, wherein the controller writes a destruction pattern to the first media surface to destroy at least one data bit previously stored on the first media surface.

18. The method of claim 10, wherein the controller moves hot data from the first data surface to the second data surface prior to the writing step.

19. An apparatus comprising a heat assisted magnetic recording (HAMR) data writer separated from a plurality of data bits stored on a media surface of a data storage medium, a controller and a prediction circuit connected to the HAMR data writer, the controller configured to remap the media surface based on a predicted failure time window of a failure mitigation strategy generated by the controller in response to a HAMR data writer failure and configured to store data identified as cold by the controller to the media surface.

20. The apparatus of claim 17, wherein the plurality of data bits stored on the surface of the data storage medium are programmed with user defined data.

* * * * *